No. 758,365. PATENTED APR. 26, 1904.
O. JACKSON.
VALVE GEAR FOR ENGINES.
APPLICATION FILED JAN. 6, 1902.
NO MODEL. 4 SHEETS—SHEET 1.

Witnesses.
O. H. Keeney.
Anna V. Faust.

Inventor.
Oswald Jackson.
By Benedick & Morsell.
Attorneys.

No. 758,365. PATENTED APR. 26, 1904.
O. JACKSON.
VALVE GEAR FOR ENGINES.
APPLICATION FILED JAN. 6, 1902.
NO MODEL. 4 SHEETS—SHEET 2.

Fig. 2.

Witnesses:
O. H. Keeney.
Gara V. Faust.

Inventor.
Oswald Jackson
By Benedict and Morsell
Attorneys.

No. 758,365. PATENTED APR. 26, 1904.
O. JACKSON.
VALVE GEAR FOR ENGINES.
APPLICATION FILED JAN. 6, 1902.
NO MODEL. 4 SHEETS—SHEET 3.

Witnesses.
A. H. Keeney.
Anna C. Faust.

Inventor.
Oswald Jackson.
By Benedict & Morsell.
Attorneys.

No. 758,365. PATENTED APR. 26, 1904.
O. JACKSON.
VALVE GEAR FOR ENGINES.
APPLICATION FILED JAN. 6, 1902.
NO MODEL. 4 SHEETS—SHEET 4.

Witnesses.
Inventor.
Oswald Jackson.
By Benedict & Morsell.
Attorneys.

No. 758,365. Patented April 26, 1904.

UNITED STATES PATENT OFFICE.

OSWALD JACKSON, OF CARROLLTON, ILLINOIS.

VALVE-GEAR FOR ENGINES.

SPECIFICATION forming part of Letters Patent No. 758,365, dated April 26, 1904.

Application filed January 6, 1902. Serial No. 88,503. (No model.)

*To all whom it may concern:*

Be it known that I, OSWALD JACKSON, residing at Carrollton, in the county of Greene and State of Illinois, have invented a new and useful Improvement in Valve-Gear and Governor Mechanism for Engines, of which the following is a description, reference being had to the accompanying drawings, which are a part of this specification.

My invention has relation to improvements in valve-gear and governor mechanism for engines. It is a well-known fact among those skilled in this particular line of machinery that that engine, other things being equal, which most nearly obtains the highest boiler-pressure on its piston at the commencement of the stroke may cut off that pressure the earliest, attain the highest rate of expansion, and exhaust steam at the lowest pressure.

It is therefore one of the important objects of my invention to obtain the above-referred-to desirable ends, the construction being such that a full head of steam is admitted at once against the end of the piston, thus doing away with the gradual admission of steam, technically known as "wire-drawn" steam, and my improved construction also being such that the steam is fully exhausted, thus obviating the back pressure existing in the cylinders of ordinary engines.

A further important object is to provide a construction of governor mechanism of such character that said governor mechanism continues to operate on the reversal of the engine.

With the above primary and other incidental objects in view the invention consists of the devices and parts or their equivalents, as hereinafter set forth.

In the accompanying drawings.

Figure 1:
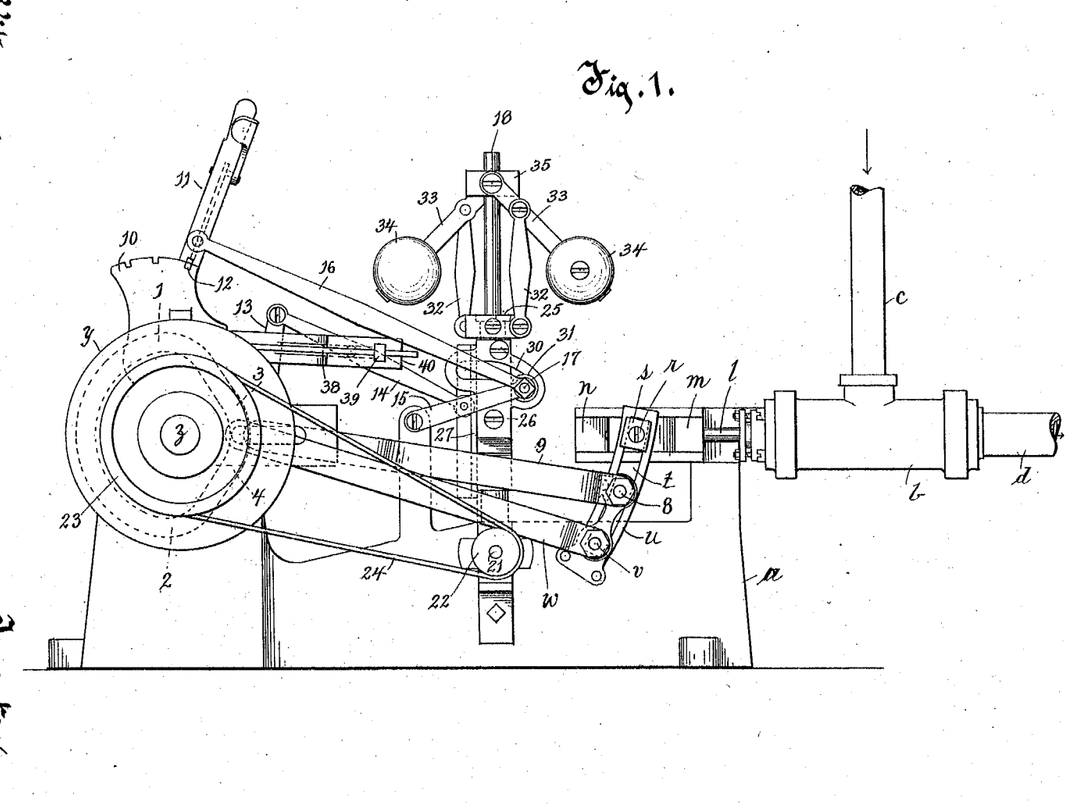
Figure 1 is a side elevation of the complete machine.
Figure 2:
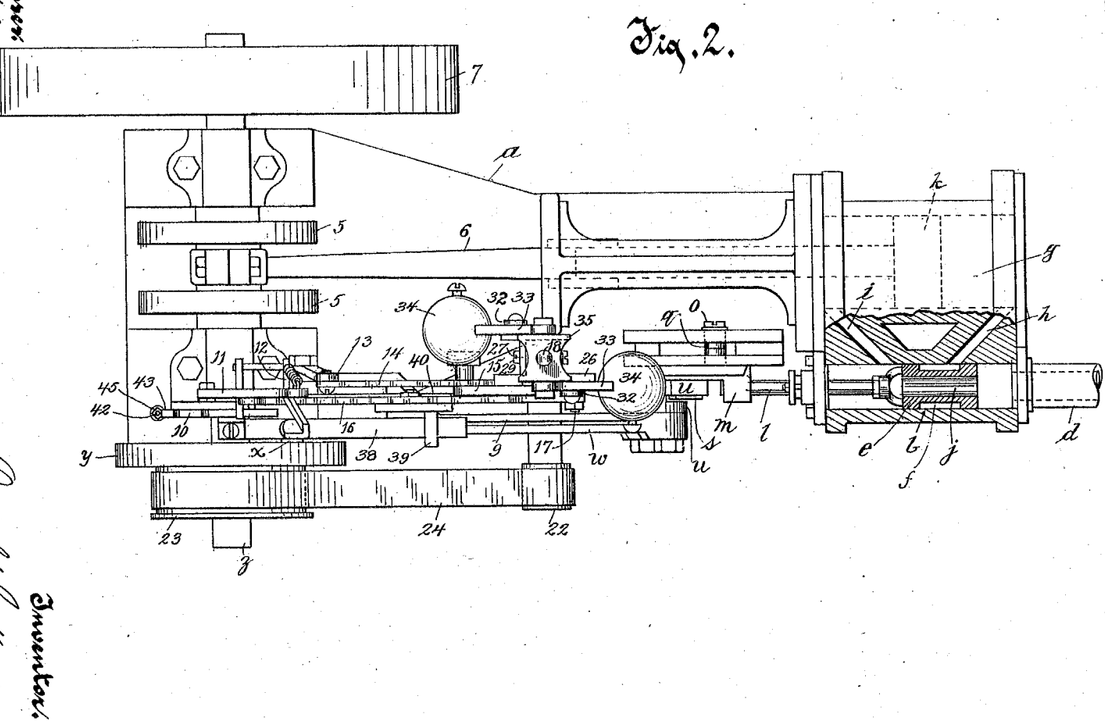
Fig. 2 is a plan view of Fig. 1, the upper portion of the valve-casing being broken away.
Figure 8:
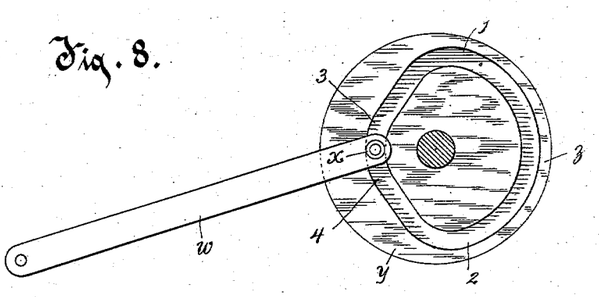
Fig. 8 is a detail view of the cam and the valve-operating arm actuated thereby.

The frame of the engine may be of any desirable form of construction best adapted for supporting the operative parts of the engine. In the accompanying drawings I show a bed $a$, on which the different parts are supported and carried. At one end of this bed is supported a valve-casing $b$, in which steam is admitted in any desirable manner, preferably from the top through a steam-inlet pipe $c$. The steam is exhausted from the valve-casing through an exhaust-pipe $d$, preferably extending from one end of said casing. Within the chamber of the valve-casing is adapted to reciprocate a valve $e$, having centrally therearound an annular steam-channel $f$. Leading from the main-valve chamber and extending to the cylinder $g$ are the usual channels $h$ and $i$. The valve is provided centrally therethrough, from end to end thereof, with a channel $j$. In the position of the valve shown in Fig. 2 the annular channel $f$ of said valve is in registration with the channel $h$, and consequently the inlet-steam admitted to the channel $f$ from the pipe $c$ is free to pass by way of the channel $h$ into the cylinder $g$ and there act against the piston $k$ in said cylinder. The steam in advance of the piston is free to exhaust by way of the channel $i$ into the valve-chamber, thence through the longitudinal passage $j$ of the valve to the exhaust-pipe $d$. Extending from the valve and through one end of the valve-casing is a valve-rod $l$. To the outer end of this valve-rod is connected a slide $m$, which is slidable in a grooveway $n$, the said slide preferably having a pin $o$ extending through slots $p$ in the guideway and having an antifriction-roller $q$ thereon working in said slots in order to reduce friction as much as possible. Projecting from the outer end of the slide m is a pin r, which carries a head s, said head working in a curved segmental slot t, formed in a movable plate u. This plate has projecting from its lower end a pin v, to which is pivotally connected one end of a valve-operating arm w. The opposite end of this arm carries a roller x, which is adapted to work in a cam-groove formed on a disk y, preferably on one side of the disk. This disk is mounted fast on the crank-shaft z of the engine. It will be noticed that the portion of the cam-groove from the points 1 to 2 is in the form of a true circle, the portions from 1 to 3 and 2 to 4 are irregular in shape or out of true circular form, while between the points 3 and 4 a short true circle is described. The crank-shaft has formed thereon the usual crank 5, to which is connected the end of the piston-rod 6, which extends from the piston of the cylinder. On one of the outer ends of the crank-shaft is mounted the usual flywheel 7.

From the center of the plate u extends a fixed pivot 8, and mounted pivotally on this pivot is one end of a radius-bar 9, the opposite end of said bar being pivotally connected to the framework.

In the operation of the mechanism as thus far described when the shaft z is revolved the disk y is of course revolved therewith. In the revolution of this disk when one of the portions 1 to 3 or 2 to 4 of the cam-groove is brought into engagement with the roller x of the arm w said arm is actuated, and inasmuch as it is pivotally connected to the lower end of the plate u the said plate is turned on the pivot formed by the connection between the radius-arm 9 and the pin 8. This turning of the plate u causes its upper end to move the slide m in its guideway, and hence actuate the valve in a direction to fully open the inlet or fully open the exhaust in accordance with which of the channels h or i is acting as the inlet or as the exhaust. At this time the roller x will have passed from the irregular portion 1 to 3 or 2 to 4 of the cam-groove on to the true circular portion of said groove between the points 1 and 2, and while said true circular portion of the groove remains in engagement with the roller of the valve-operating arm the admission and exhaust channels are maintained opened to their full extent. By this arrangement a full head of steam is admitted at once against the end of the piston, and an instantaneous and full exhaust is also provided, the exhaust starting a little prior to the admission of the inlet-steam. Heretofore the admission of the inlet-steam and the exhaust of the exhaust-steam has been gradual, and by the time the inlet-port is opened fully the valve begins to close said port. In my improved construction both the inlet and exhaust ports, as stated, are opened instantly and remain open for a short period of time in order that the piston may derive the benefit of the full head of steam, and at the same time the exhaust-steam in advance of the piston is exhausted, thereby obviating the back pressure existing in cylinders of the ordinary form of engines. It will also be apparent that in my form of valve-gear during this period of inaction of the valve the parts are not subjected to wear, as is the case in constructions wherein the valve is under constant and continual reciprocation.

Attention is directed to the fact that there is a small portion of the cam-groove between the points 3 and 4 and connecting the irregular portions of said groove, which is also on a true circle, and consequently when the roller is on this smaller true circle, the valve is also inactive. Again, when the valve is in motion there is of course a short period of time when both the inlet and exhaust channels are closed by said valve. During this brief period the piston k is actuated by the expansion of the steam in the cylinder.

While I prefer to construct the cam-groove in the manner shown in the drawings, particularly as illustrated in Fig. 8, yet I do not wish to limit myself specifically thereto, inasmuch as the same result in operation could be obtained if the true circular portions between 1 and 2 and 3 and 4 were omitted altogether and only the irregular or inclined portions of the groove provided. It is obvious that in this arrangement as the disk y is revolved the inclined or irregular portions of the groove will alternately engage the roller of the valve-operating arm, and hence actuate said arm, and when these irregular portions of the groove leave the roller of the valve-operating arm the said arm will remain inactive.

In connection with my invention I provide means for stopping altogether the operation of the valve or for reversing the direction of rotation of the crank-shaft. This consists in providing a notched segment 10 and a lever 11, carrying a spring-controlled dog 12, provided with a suitable finger-piece for operating it, the said dog adapted to work over the upper notched segmental edge of the segment and to engage any of the series of notches. Any desirable connection between the lever 11 and the radius-bar 9 may be provided which will effect the function, when the lever is shifted, of raising the radius-bar, and consequently the segmentally-slotted plate u. Inasmuch as I have shown my invention in connection with governor mechanism adapted to control the speed of the engine in either direction in which said engine may be running, it is necessary where this particular governor mechanism is employed to provide a special form of connection between the lever 11 and the radius-bar 9. Referring to this mechanism, the numeral 13 indicates an arm extending upwardly from the outer end of the radius-bar and forming, in connection with the radius-bar, practically the short arm of a bell-crank lever. Pivotally connected to the upper end of this arm 13 is a link 14. The opposite end of this link is pivotally connected to a medial point of a pivoted arm 15, and the upper end of this arm 15 in turn is pivotally connected to a link 16 by means of a pivot-pin 17. The opposite end of link 16 is pivotally connected to the lever 11.

Figure 3:
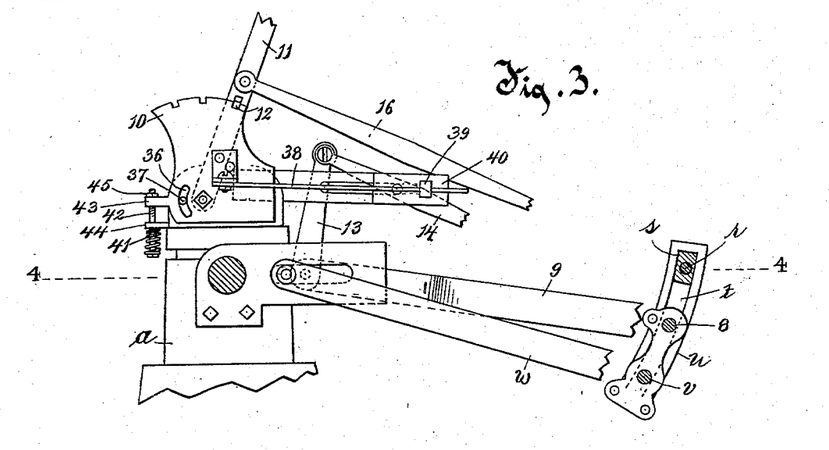
Fig. 3 is a transverse section through the crank-shaft looking upon certain of the parts in side elevation, parts being shown in section and parts broken away.
Figure 4:
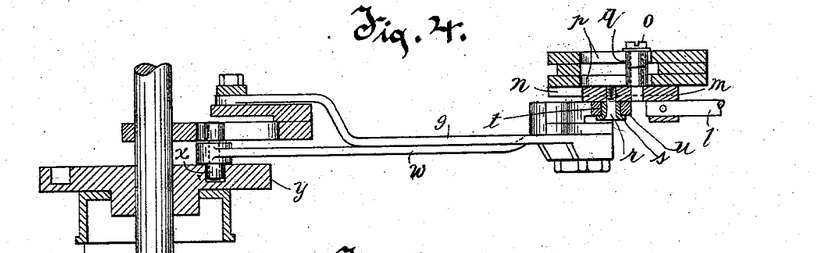
Fig. 4 is a horizontal section on the line 4 4 of Fig. 3.
Figures 5, 7:
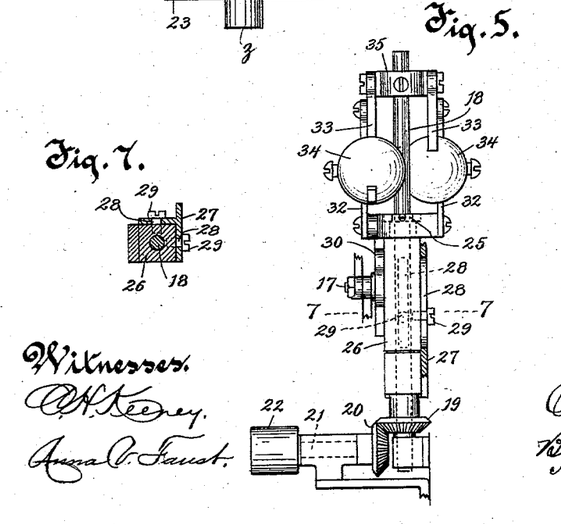
Fig. 5 is an elevation of the governor mechanism.
Fig. 7 is a section on the line 7 7 of Fig. 5.
Figure 6:
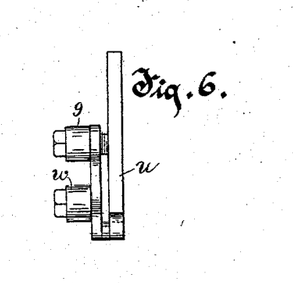
Fig. 6 is a detail edge view of the slotted segment, showing the ends of the valve-operating arm and the radius-bar pivotally connected thereto.

In the operation of the mechanism just described if the lever 11 is in the position shown in Figs. 1 and 3 and pressure is exerted on the finger-piece of the dog 12 the said dog is released from the end notch, and the lever is then free to be swung toward the left of Fig. 1. When it reaches a central position of the notched edge of the segment, if further swinging of the lever is stopped and finger-pressure on the finger-piece of the dog is removed the said dog will automatically engage the central notch of the segment, and thereby hold the lever in this adjusted position. By the movement of the lever just referred to a pull of course is exerted on the link 16, and this link in turn will cause a turning of the pivoted arm 15, and by reason of the connection between said pivoted arm and the arm 13, extending upwardly from the radius-bar, said arm 13 is rocked outwardly, and consequently an upward swing of the radius-bar is thereby effected. As the radius-bar thus moves upwardly it carries the segmentally-slotted plate $u$ therewith. The swinging of the lever to the position stated—that is, to the extent to permit the dog to engage the central notch of the segment—will raise the segmentally-slotted plate $u$ just high enough to throw the pivot which connects the radius-bar to the segmentally-slotted plate in line with the valve-rod $l$. In this position of the parts it is evident that there is no rocking movement imparted to the segmentally-slotted plate, and consequently the valve is not actuated, the said valve, by the adjustment referred to, having been moved to a position to close off the inlet and exhaust channels, and hence the engine is brought to a standstill. If now the lever 11 is thrown farther to the left, so that the dog thereof engages with the outer end notch of the segment, the central pivot of the segmentally-slotted plate is brought above the valve-rod $l$, and hence the valve is actuated in an opposite direction to that in which it is operated when the dog of the lever was in engagement with the inner notch of the segment, and the rotation of the crank-shaft is thereby reversed. While in the accompanying drawings I have only shown three notches in the segment, yet it will be understood that any desirable number may be provided, so that the lever may be held in adjusted position at various points over the notched edge of the segment.

Referring now to the governor mechanism, the numeral 18 indicates an upright shaft which is provided at its lower end with a beveled pinion 19, said pinion meshing with a similar pinion 20 on the inner end of a horizontal shaft 21. On the outer end of shaft 21 is a belt-pulley 22, which is connected up to a pulley 23, mounted on the cam-shaft $z$ by means of a belt 24. It is obvious that by this connection when the cam-shaft is rotated rotation is thereby imparted to the governor-shaft. Slidingly mounted on the governor-shaft is the usual head 25, and from this head depends a downwardly-extending projection 26. The head is so connected to this projection as to carry said projection therewith when the head is moved longitudinally on the governor-shaft; but yet said head is capable of free rotation. The depending projection 26 fits within an angular guide 27, each wall of said guide being formed with an elongated slot 28. These slots receive small screws 29 29, extending from the corresponding walls of the projection 26. The projection 26 also carries a segmentally-slotted portion 30, the segmental slot thereof receiving therein an antifriction-roller 31, mounted on the pivot-pin 17. Pivoted to and extending upwardly from the head 25 are the usual links 32, the upper ends of said links being pivotally connected to the governor-ball arms 33, the outer ends of which carrry the governor balls or weights 34. The upper ends of the arms 33 are pivoted to the usual fixed head 35 on the governor-shaft. In order that the mechanism thus far described may be operated, it is necessary that the segment 10 should have a limited pivotal swing. For this purpose said segment is provided at its lower portion and near the rear edge thereof with a short segmental slot 36, which receives a pivot-pin 37, projecting from a fixed part. When the segment 10 is rocked on this pivot by the flying outwardly of the governor-balls, as hereinafter more fully referred to, it is returned to its normal position by means of a flat spring 38, secured to the side of the segment and extending longitudinally and having its end engaging a slot in the lug 39, projecting laterally from an an adjustable block 40, said block when adjusted regulating the tension of the spring.

In the operation of this governor mechanism if the lever 11 is in the position illustrated in the drawings and the speed of the engine becomes too great the governor weights or balls will fly outwardly, and thus exert a pull on the links 32, and thereby raise the head 25, and the depending projection 26 of said head, the projection being guided by reason of the engagement of the screws 29 with the elongated slots 28. This upward movement of the projection 26 also carries with it the segmentally-slotted portion 30, and the slot thereof is thereby caused to act on the antifriction-roller 31 in such manner as to raise the arm 15. This raising of the arm 15 will cause the link 16 to be thrust backwardly and exert sufficient force on the lever 11 to cause a turning of the segment 10 on its pivot against the contrary force exerted by the spring 38. This action of the governor-balls also causes a pull on the radius-arm 9 by reason of the connection of the link 14 with the upwardly-extending arm 13 of the radius-bar, and this movement of the radius-bar is such as to raise the segmentally-slotted plate $u$ to a position in which the central pivot is more nearly in line with the valve-rod $l$. This of course causes a reduction of speed of the engine. When the speed of the engine becomes sufficiently reduced, the governor weights or balls move inwardly, and this lowers the segmentally-slotted portion 30, and consequently returns the other parts to their normal positions, said parts being assisted in their return by the action of the spring 38. When the lever 11 is swung over to the left, so that the dog 12 thereof is brought into engagement with the end notch on the left-hand end of the segment 10, this movement of the lever causes a pull on the link 16, and consequently compels the roller 31 to ride in the slot of the segmentally-slotted portion 30, and hence thereby move the depending projection 26, the head 25, and the parts thereabove upwardly, the governor balls or weights being raised by the links 32 above the fixed head 35. In this adjustment the direction of rotation of the crank-shaft is of course reversed, and if the speed of the engine under this adjustment becomes too great the governor-ball weights move downwardly, and thereby force the segmentally-slotted plate $u$ downwardly to a position in which its central pivot is more nearly in line with the valve-rod $l$. Of course under this action the speed of the engine is reduced. When the governor-balls are raised under this last-described adjustment in which a reversal of the engine is secured, if no means were provided the weight of the balls would even when the engine is running at a normal speed have a tendency to lower the head 25, and hence rock the segment 10 inwardly slightly. To guard against this, I provide a counteracting spring 41, which spring encircles the lower portion of a rod 42, said rod passing through openings in outwardly-extending lugs 43 and 44, the former lug projecting from the segment and the latter from the fixed framework. The spring is arranged beneath the lug 44 and is confined between said lug and the head of the rod. The upper end of the rod is threaded and receives a nut 45. By turning this nut the tension of the spring may be either increased or decreased, in accordance with the direction of turning. It will be seen from this arrangement that the spring is under compression, and consequently exerts downward pressure against the head of the rod or bolt, and hence counteracts the opposed influence of the governor-balls.

Figures 9, 10:
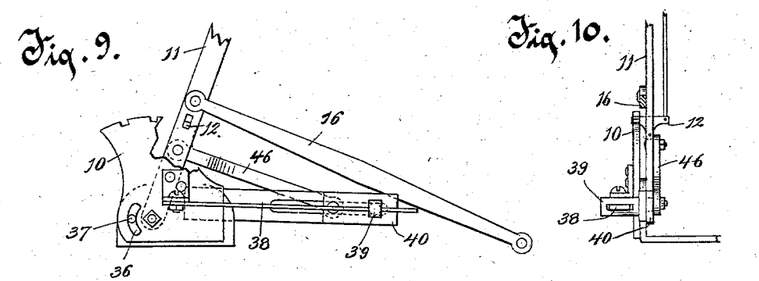
Fig. 9 is a detail view of a modified form of device for tightening the spring which is employed for counterbalancing the weight of the governor-balls when said balls are raised.
Fig. 10 is an edge view of Fig. 9.

In Fig. 9 I show a slightly-modified form of construction for accomplishing the same purpose. In this modified form I connect to the slide which carries the lug 39, which is engaged by the flat spring 38, a link 46, the opposite end of said link being pivotally connected to the lever 11. When the lever 11 is in the adjustment shown in the drawings, the slide carrying the lug 39 is near the outer end of the spring 38, and hence said spring offers the least resistance. When, however, the lever is turned to the left and the governor-weights are elevated and it is then necessary that the spring should offer resistance to the weight of the governor-balls, the link 46 pulls said slide in a direction to bring the lug 39 nearer the center of the spring 38, and hence said spring is thereby made stiffer, and consequently offers more resistance.

Figure 11:
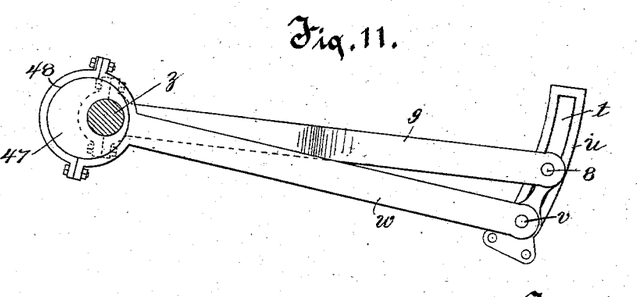
Fig. 11 is a view of a modified form, showing the invention adaptable to a crank-shaft having an ordinary eccentric thereon.

In Fig. 11 of the drawings I show a form of construction wherein the peculiar cam-groove employed by me for actuating the valve-operating arm $w$ is dispensed with and in lieu thereof an ordinary eccentric employed. By this means it is possible to use my invention in connection with any engine which is fitted with the ordinary eccentric and yoke. The radius-arm in such case is merely extended back to the shaft carrying the eccentric. The numeral 47 indicates the eccentric mounted on the shaft $z$, and 48 the ring at the end of the valve-operating arm which surrounds this eccentric. In this figure the radius-arm is also shown as extended back to the shaft $z$. Under this arrangement it is obvious that the revolving of the eccentric will actuate the valve-operating arm, but that the radius-arm will not be moved. The operation of the valve-operating arm will of course turn the slotted plate $u$ on the pivot 8, and thereby cause an actuation of the valve-rod $l$.

Besides the advantages already pointed out in regard to my invention it is to be stated that it includes all the advantages in any and every class of engine possessed by an ordinary Corliss valve-gear and does away with "wire-drawn" steam not only in the valve, but also in the governor, accomplishing the latter by dispensing entirely with the necessity of a throttling-governor. The invention, furthermore, avoids entirely the intense compression which exists in the cylinders of ordinary engines.

What I claim as my invention is—

1. In a valve-gear, the combination of a valve-casing, a valve therein for regulating the channels leading to and from the cylinder, valve-operating mechanism, a crank-shaft, mechanism carried by the crank-shaft and adapted to operate on the valve-operating mechanism and cause an actuation of said valve-operating mechanism, mechanism for reversing the movement of the valve-operating mechanism in order to cause a reversal of rotation of the engine, a governor-shaft, a connection between the governor-shaft and the crank-shaft, whereby the rotation of the crank-shaft is imparted to the governor-shaft, mechanism rotatable with the governor-shaft, governor-weights pivotally connected to said mechanism, means for adjusting said weights either upwardly or downwardly in order to raise or lower the same, and a connection between the governor mechanism and the valve-operating mechanism, said connection adapted, when the speed of the engine rises above or falls below a normal speed and when the engine is running in either direction, to so operate on the valve-operating mechanism as to regulate the speed of the engine.

2. In a valve-gear, the combination of a valve-casing, a valve therein for regulating the channels leading to and from the cylinder, valve-operating mechanism, a crank-shaft, mechanism carried by the crank-shaft and adapted to operate on the valve-operating mechanism and cause an actuation thereof, mechanism for reversing the movement of the valve-operating mechanism in order to cause a reversal of rotation of the engine, a governor-shaft, a connection between the governor-shaft and the crank-shaft whereby the rotation of the crank-shaft is imparted to the governor-shaft, mechanism rotatable with the governor-shaft, governor-weights pivotally connected to said mechanism, means for adjusting the weights either upwardly or downwardly in order to raise or lower the same, means for counteracting the weight of the governor-weights when said weights are in their raised position, and a connection between the governor mechanism and the valve-operating mechanism, said connection adapted, when the speed of the engine rises above or falls below a normal speed and when the engine is running in either direction, to so operate on the valve-operating mechanism as to regulate the speed of the engine.

3. In a valve-gear, the combination of a valve-casing, a valve therein for regulating the channels leading to and from the cylinder, valve-operating mechanism, a crank-shaft, mechanism carried by the crank-shaft and adapted to operate on the valve-operating mechanism and cause an actuation thereof, mechanism for reversing the movement of the valve-operating mechanism in order to cause a reversal of the rotation of the engine, a governor-shaft, a connection between the governor-shaft and the crank-shaft whereby the rotation of the crank-shaft is imparted to the governor-shaft, mechanism rotatable with the governor-shaft, governor-weights pivotally connected to said mechanism, means for adjusting the weights either upwardly or downwardly in order to raise or lower the same, adjustable means for counteracting the weight of the governor-weights when said weights are in their raised position, and a connection between the governor mechanism and the valve-operating mechanism, said connection adapted, when the speed of the engine rises above or falls below a normal speed and when the engine is running in either direction, to so operate on the valve-operating mechanism as to regulate the speed of the engine.

4. In a valve-gear, the combination of a valve-casing, a valve therein for regulating the channels leading to and from the cylinder, valve-operating mechanism, a crank-shaft, mechanism carried by the crank-shaft and adapted to operate on the valve-operating mechanism and cause an actuation thereof, mechanism for reversing the movement of the valve-operating mechanism in order to cause a reversal of rotation of the engine, a governor-shaft, a connection between said shaft and the crank-shaft whereby the rotation of the crank-shaft is imparted to the governor-shaft, mechanism rotatable with and slidable on the governor-shaft, said mechanism carrying a segmentally-slotted portion, governor-weights pivotally connected to the slidable mechanism, a lever, a link having one end pivotally connected to the lever and its opposite end provided with a projection extending into the slot of the segmentally-slotted portion, and adapted when the lever is operated in one direction to raise the governor-weights, and when operated in the opposite direction to lower said weights, and a connection between the governor mechanism and the valve-operating mechanism, said connection adapted when the speed of the engine rises above or falls below a normal speed and when the engine is running in either direction to so operate on the valve-operating mechanism as to regulate the speed of the engine.

5. In a valve-gear, the combination of a valve-casing, a valve therein for regulating the channels leading to and from the cylinder, valve-operating mechanism, a crank-shaft, mechanism carried by the crank-shaft and adapted to operate on the valve-operating mechanism and cause an actuation of said valve-operating mechanism, mechanism for reversing the movement of the valve-operating mechanism in order to cause a reversal of rotation of the engine, a governor-shaft, a connection between said shaft and the crank-shaft, whereby the rotation of the crank-shaft is imparted to the governor-shaft, mechanism rotatable with and slidable on the governor-shaft, said mechanism carrying a segmentally-slotted portion, governor-weights pivotally connected to said mechanism, a notched segment, said segment provided with a segmental slot, a pin extending from the fixed part and entering said slot, a lug extending from a fixed part, a lug extending from the segment, a rod passing through said lugs, a coiled spring surrounding the rod, and confined between the lug extending from the fixed part and the head of the rod, a lever working over the notched segment and provided with a dog adapted to engage any of the notches, a link having one end connected to the lever and its opposite end provided with a projection extending into the slot of the segmentally-slotted portion of the slidable mechanism of the governor-shaft, and adapted when the lever is operated in one direction to raise the governor-weights, and when operated in the opposite direction to lower said weights, and a connection between the governor mechanism and the valve-operating mechanism, said connection adapted, when the speed of the engine rises above or falls below a normal speed and when the engine is running in either direction, to so operate on the valve-operating mechanism as to regulate the speed of the engine.

6. In a valve-gear, the combination of a valve-casing, a valve therein for regulating the channels leading to and from the cylinder, said valve provided with a projecting valve-rod, a segmentally-slotted plate having a pivotal connection with the valve-rod and movable on said pivot transversely of the plane of the valve-rod, an intermediate pivot extending from the segmentally-slotted plate, a valve-operating arm pivotally connected to one end of the segmentally-slotted plate, a crank-shaft, mechanism on the crank-shaft for reciprocating the valve-operating arm, a radius-bar having one end pivotally connected to the intermediate pivot of the segmentally-slotted plate, and having its opposite end pivoted and provided with a projecting arm, a governor-shaft, a connection between said shaft and the crank-shaft whereby the rotation of said crank-shaft is imparted to the governor-shaft, mechanism rotatable with and slidable on the governor-shaft, said mechanism carrying a segmentally-slotted portion, governor-weights pivotally connected to said mechanism, a lever, a link having one end pivotally connected to the lever and its opposite end provided with a projection extending into the slot of the segmentally-slotted portion of the slidable mechanism of the governor-shaft, and adapted when the lever is operated in one direction to raise the governor-weights, and when operated in the opposite direction to lower said weights, and a connection between said link and the radius-bar.

7. In a valve-gear, a valve-working mechanism, a hand operating means for adjusting the valve-working mechanism, said hand operating means being yieldably mounted, and a governor having connection with the hand operating means for moving the said hand operating means in its mounting and thereby automatically adjust the valve-working mechanism.

8. In a valve-gear, a valve-working mechanism, a pivoted notched segment under spring-pressure, an adjusting-lever working in conjunction with the notched segment and having control over the operation of the valve-working mechanism, and a governor having connection with the adjusting-lever for moving said lever with the notched segment and thereby automatically adjusting the valve-working mechanism.

9. In a valve-gear, a valve-working mechanism, a hand operating means for adjusting the valve-working mechanism, a governor-shaft, a rigid head and a slidable head thereon, governor weight-arms pivoted to the rigid head and having link connection with the slidable head, a connection between the hand operating means and the slidable head for changing the position of the governor-weights with relation to the rigid head so that when the engine is running in one direction the governor-weights are below the rigid head when the engine is running in the other direction the governor-weights are above the rigid head, said operating means being influenced by the governor to automatically adjust the valve-working mechanism.

10. In a valve-gear, a valve-working mechanism comprising a crank-shaft, a swinging arm receiving longitudinal movement from the crank-shaft at one end, a link pivoted to the other end of the arm, a bell-crank lever having a stationary pivot and one arm pivoted to the link, and a valve-rod having a sliding connection with the link; in combination with a hand operating means comprising a hand-lever, a yielding notched segment engaged by the hand-lever, a lever having a fixed pivot, and rods connecting said lever with the hand-lever and the other arm of the bell-crank lever; and a governor mechanism comprising a shaft, a movable and fixed head thereon, weight-arms pivoted to the fixed head and having a link connection with the movable head, and a plate carried by the movable head having connection with the lever and the hand operating means.

11. In a valve-gear, a valve-working mechanism, a hand operating means for adjusting the valve-working mechanism comprising a hand-lever in connection with the valve-working mechanism, a notched segment engaged by the lever, said notched segment being pivotally mounted, means for determining the normal position of the notched segment with pressure, and a governor mechanism in connection with the hand operating means for moving the segment out of its normal position to automatically adjust the valve-working mechanism.

12. In a valve-gear, a valve-working mechanism, a hand operating means for adjusting the valve-working mechanism comprising a hand-lever in connection with the valve-working mechanism, a notched segment engaged by the lever, said notched segment being pivotally mounted, a spring for determining the normal position of the notched segment, and a governor mechanism in connection with the hand operating means and adapted to have the weights thereof suspended when the engine is running in one direction and elevated when the engine is running in the other direction, and means for automatically increasing the tension of the spring when the governor-weights are elevated.

In testimony whereof I affix my signature in presence of two witnesses.

OSWALD JACKSON.

Witnesses:
F. F. VERTRUS,
S. A. VEDDER.